United States Patent [19]

Asciutto

[11] Patent Number: 4,632,354

[45] Date of Patent: Dec. 30, 1986

[54] FLEXIBLE SAFETY MAST MOUNTING

[76] Inventor: Joseph S. Asciutto, 1718 E. Madison Ave., El Cajon, Calif. 92021

[21] Appl. No.: 763,521

[22] Filed: Aug. 8, 1985

[51] Int. Cl.$^4$ ............................................. B62J 27/00
[52] U.S. Cl. .................................... 248/539; 248/160; 116/173; 280/289 R; 343/715; 343/900
[58] Field of Search ............... 248/511, 519, 523, 529, 248/534, 539, 540, 160; 343/715, 900, 901, 892; 174/138 A, 152 A, 153 A; 280/289 R, 289 H; 116/173-175, 28 R; 403/405.1, 406.1

[56] References Cited

U.S. PATENT DOCUMENTS

| | | | |
|---|---|---|---|
| 1,266,770 | 5/1918 | Burton | 248/539 |
| 2,312,107 | 2/1943 | Mace | 248/539 |
| 2,536,053 | 1/1951 | Grashow | 174/153 A |
| 4,170,777 | 10/1979 | Liautand | 343/715 |
| 4,209,788 | 6/1980 | Plantier | 343/715 |
| 4,218,684 | 8/1980 | Northcutt | 343/715 |
| 4,360,814 | 11/1982 | Wells | 343/715 |
| 4,364,051 | 12/1982 | Yamashita | 343/715 |

FOREIGN PATENT DOCUMENTS

| | | | |
|---|---|---|---|
| 920969 | 12/1954 | Fed. Rep. of Germany | 343/900 |
| 104412 | 6/1964 | Norway | 343/900 |
| 751542 | 6/1956 | United Kingdom | 343/900 |

Primary Examiner—J. Franklin Foss
Assistant Examiner—Robert A. Olson
Attorney, Agent, or Firm—George J. Rubens

[57] ABSTRACT

A mast mounting assembly is provided for supporting a safety flag mast, communication antenna or the like. The novel assembly comprises a mounting bolt that can be permanently attached to a vehicle with the free end of the bolt extending in an upright position. The free end of the bolt has a drilled bore opening to receive and anchor the lower base end of the mast. A collar has a pair of bore openings extending from opposite ends thereof, one of the openings being smaller in diameter through which the base end of the mast can be press-fitted, the other of the openings adapted to be press-fitted over the mounting bolt. The collar is made of a hard resilient material, such as a urethane plastic, to provide a resilient support to the base of the mast for dampening the oscillations to prevent injury to the vehicle operator. In event of damage to the mast, such as by vehicle roll over, the collar can be pulled off the mounting bolt and the mast without the need for any tools.

12 Claims, 4 Drawing Figures

U.S. Patent  Dec. 30, 1986  4,632,354
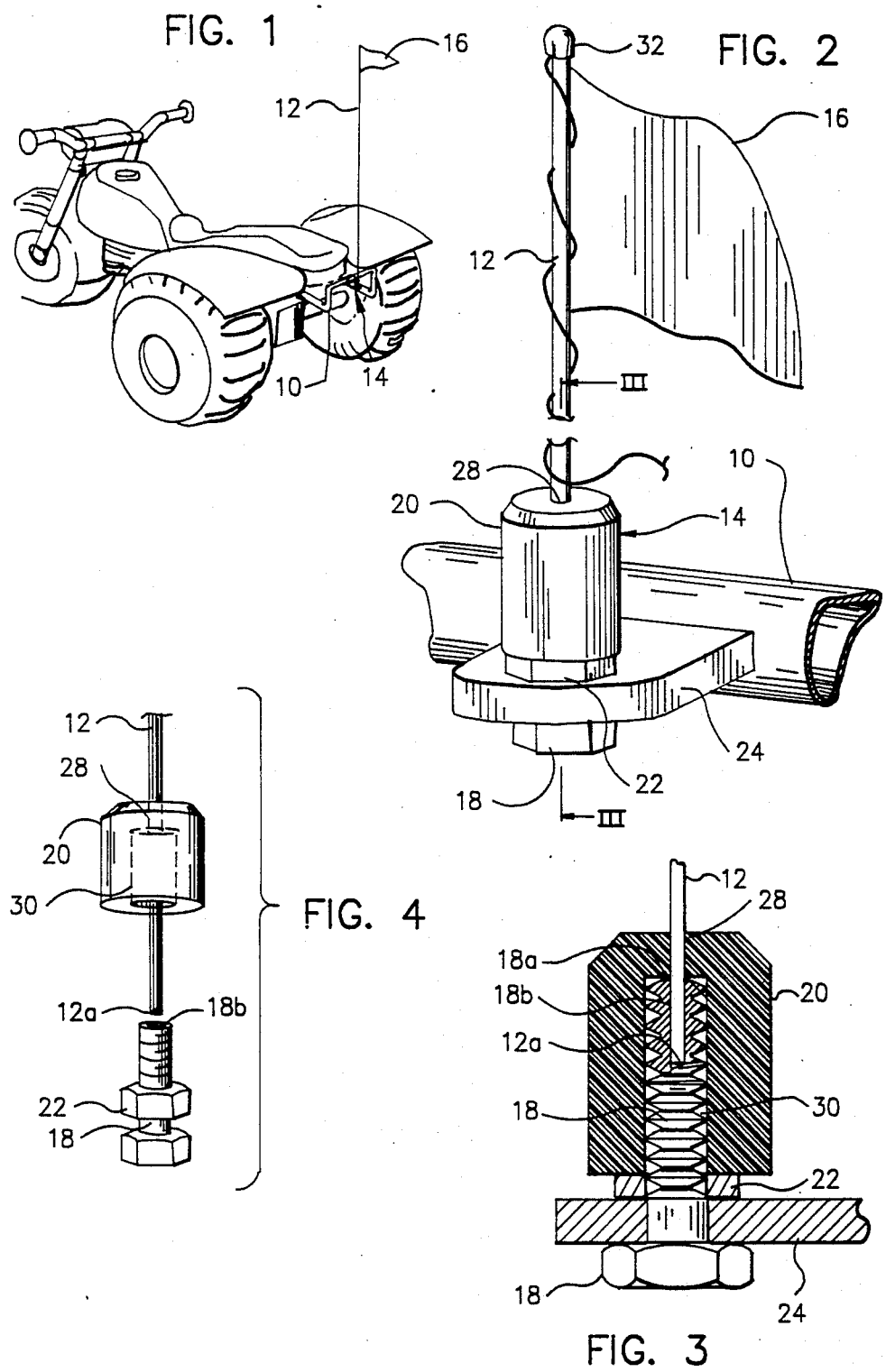

FLEXIBLE SAFETY MAST MOUNTING

SUMMARY OF THE INVENTION

This invention relates to mounting assemblies for antenna-like masts, and more particularly to a resilient mounting assembly for said masts capable of dampening severe oscillations, and which assembly can be quickly installed and removed by hand for repairs, or routine installation or removal, without the need for tools.

The extensive use of various types of off-road vehicles, especially those vehicles known as All Terrain Vehicles (ATV), has caused an alarming increase of injuries, many fatal, as reported by the Federal Government Consumer Product Safety Commission. These injuries are caused principally by the disregard by operators of such vehicles of available safety equipment.

As the name implies, ATV vehicles are used in hilly terrains, such as sand dunes, and are driven at high speed accompanied with radical maneuvers. As traffic controls in these areas are non-existent, early awareness of approaching vehicles is imperative if collisions are to be avoided. Lack of operator skill combined with the hilly terrain, plus excessive speed, can cause the ATV to rollover placing a severe stress on the safety masts causing breakage or sharp bends requiring replacement or repair.

A number of different safety masts assemblies are commercially available, all carrying a flag, and some also provided with a light for night operations. The use of such safety equipment is recommended by most off road parks, and the more safety minded ATV operators. The damage or breakage, and subsequent repair or replacement costs, and the time required for initial or routine installation are the most common excuses for not using safety masts.

If the mast mounting assembly incorporates a spring or soft rubber mounting, excess oscillations of the mast can strike the back and head of the vehicle operator, while a mounting design that does not provide sufficient dampening of mast oscillations can cause frequent breakage of the mast. In those prior art mounting designs that incorporate a breakaway device, inoperability or premature disconnections discourages continued use of a safety mast.

Still other disadvantages of prior art safety mast mounting devices is the difficulty and time required to repair and reinstall damaged masts in the field, and the need for tools to make such repairs.

OBJECTS OF THE INVENTIONS

A principle object of this invention is to provide a mounting assembly for a mast or antenna that can be easily and quickly installed or repaired in the field without the need for tools.

Another important object is to provide such a mounting that will dampen excess oscillations of the mast during movement of the vehicle that might otherwise cause injury to the operator; and a corollary object is to resiliently support the base of the mast to prevent sharp bends should the vehicle be rolled over.

Still other objects are to provide such a mast mounting that is simple in construction having a minimum of parts, and and which is inexpensive in cost.

DESCRIPTION OF THE FIGURES

FIG. 1 is a perspective view of one type of vehicle, namely an All Terrain Vehicle (ATV) on which a safety mast is mounted by the novel mounting assembly of this invention.

FIG. 2 is an enlarged elevation view of the safety mast mounting assembly of FIG. 1.

FIG. 3 is a vertical cross section view taken along line III—III of FIG. 2.

FIG. 4 is an exploded view of the mounting assembly components.

DETAILED DESCRIPTION OF THE INVENTION

Referring to the drawing where like reference numerals refer to similar parts throughout the figures, there is shown in FIG. 1, a typical type of All Terrain Vehicle (ATV) 10 on which a mast 12 can be mounted by a novel mounting assembly 14, when the mast is used as a safety antenna for carrying a flag 16 at its upper free end. Although mounting assembly 14 is particularly suited for ATV's where the safety antenna is subjected to severe bending or breakage from vehicle rollovers, it should be understood that mounting assembly 14 can be employed to support any rod-shaped masts, such as communication antennas, and mounted on various types vehicles and vessels. Mast 12 can be constructed of a solid or hollow metal rod or made of fiberglass or the like.

As best shown in FIGS. 2 to 4, mounting assembly 14 consists essentially of two components, namely, a mounting bolt 18, and a grip collar 20 for securing the mast to the mounting bolt in a manner that can be readily and easily connected and disconnected without the need for tools as will be described. Mounting bolt 18 can be a conventional, off-the-shelf bolt, preferably, but not necessarily, threaded throughout its length for a purpose to be described.

Bolt 18 is mounted with its fre end 18a in an upright position by means of a nut 22 to an electrically grounded portion of the vehicle frame, such as by mounting plate 24 which can be clamped or otherwise attached to the vehicle frame and forms no part of this invention. Bolt end 18a has a drilled bore opening 18b extending substantially into the length of the bolt for receiving and anchoring base end 12a of the mast.

Grip collar 20 is shown as a cylindrical rod shaped member made of a hard resilient material, such as rubber or plastic. A urethane plastic has been found to be particularly suited for its superior abrasion resistant quality. Although grip collar 20 is shown to be cylindrical as a manufacturing expedient, other geometrical configurations can be used or its outer surface roughened to enhance gripping by a hand during installation and removal. A pair of bore openings 28 and 30 are formed in opposite ends of collar 20, each opening extending to about a midpoint position forming a continuous bore opening throughout the length of the collar. Opening 28 is substantially the same diameter as mast end 12a to ensure a snug push fit, and opening 30 is substantially the same diameter as bolt 18 also to provide a snug push fit being enhanced by the threads on the bolt. The tight fit of collar 20 with both mast end 12a and bolt 18 discourages the entry of dust and moisture that can cause corrosion, and electrical shorts if a warning light 32 is employed on the top of the mast for night driving.

In operation with mast 12 snugly anchored to the vehicle by mounting assembly 14, vibration caused by oscillations of the mast during vehicle travel is transmitted to base end 12a of the mast which is securely anchored within bolt opening 18b. That portion of the mast snugly encompassed in collar 28 is able to flex into the resilient collar which absorbs some of the vibration to dampen the oscillations. The degree of dampening is directly proportional to the length of the collar around mast base 12a. Dampening excess oscillations of the mast minimizes the likelihood of injury to the vehicle operator's head and shoulders. The resilience of collar 20 also minimizes the possibility of breakage of mast end 12a by enabling the mast end to bend along a more gentle radius rather than a sharp bend.

Installation of the mast on the vehicle is a simple matter. Mounting bolt is secured to a suitable part of the vehicle frame which is grounded thereto by locking nut 22. The bolt end 18b is oriented in an upright position. Once installed, bolt 18 may be left permanently attached to the vehicle and need not be disturbed during subsequent installation or repair of the mast. Mast end 12a is the pushed by hand through collar openings 28 and 30 until it extends beyond the end of the collar. Mast end 12a is then seated into bolt opening 18b and maintained therein in a seated condition until collar 20 can be slid over the mast and press-fitted by hand around bolt 18 until bolt end is fully seated within collar opening 30.

The repair of a damaged mast by vehicle roll over or the like is equally as simple as installation as the mast can be removed from the mounting assembly by hand without the need for tools. Grip collar 20 can be pulled off both bolt 18 and mast end 12a, and after repair of the mast reassembled in the reverse sequence.

The advantages of the novel mast mounting assembly 14 are apparent as it is extremely simple with a minimum of parts and inexpensive to manufacture. The mounting assembly minimizes injury to the operator by dampening excess oscillations of the mast, and the mast can be easily and quickly repaired under field conditions without the need for tools.

I claim:

1. A mounting assembly for a mast having a base end and a free end comprising:
   a mast support member having a socket opening to receive and anchor the mast base end and having means for attachment to a structure;
   a grip collar for encircling the base end of the mast and the support member and for detachably securing the mast to the support member;
   said grip collar made of a relatively hard and resilient material for receiving both the base end of the mast and the support member by a press fit functioning to dampen any oscillation of the mast;
   whereby in the event of damage to the mast, the mast can be disconnected and reconnected to the support member by the press fitting connection of the grip collar.

2. The mounting assembly of claim 1 wherein said support member is a bolt-like member adapted to be mounted at one end to the structure and having a free end oriented in a substantially vertical position.

3. The mounting assembly of claim 2 wherein said bolt llike member is threaded to receive a nut which is a part of the attachment means for securing the assembly to the structure.

4. The mounting assembly of claim 2 wherein the free end of the bolt-like member has a bore socket opening extending for a substantial portion of its length for receiving and anchoring the base end of the mast.

5. The mounting assembly of claim 4 wherein said grip collar has a pair of connecting bore openings, one opening at each end of the collar, one of said bore openings to receive the base end of the mast in a snug fit, and the other of said openings to receive the free end of the bolt-like member in a snug fit.

6. The mounting assembly of claim 1 wherein the length of the grip collar is adapted to encircle the base end of the mast, and the composition of the grip collar can be varied to change its oscillation dampening effect.

7. The mounting assembly of claim 5 wherein said bore openings extend approximately to a midpoint in the length of the grip collar.

8. The mounting assembly of claim 5 wherein the diameters of both of said openings in the grip collar provide a snug press fit.

9. The mounting assembly of claim 8 wherein said bolt-like member is threaded throughout its length to enhance its frictional engagement with the grip collar.

10. A mounting assembly for a safety antenna supporting a flag comprising:
    a threaded bolt having a cap end and a free end;
    a nut threaded on the bolt for securing the bolt to a vehicle;
    said free end of the bolt having a bore socket opening to receive and anchor one end of the antenna;
    a grip collar having a pair of connecting bore openings, one of said openings receiving and gripping the free end of the bolt, and the other of said openings for receiving and gripping one end of the antenna;
    said collar made of a hard and resilient material for enabling said one end of the mast to flex along a gentle curve and dampen any vibrations to which said antenna may be subjected.

11. The mounting assembly of claim 10 wherein said collar is made of a plastic material and covers the bolt.

12. The combination of a whip antenna mast and a mounting assembly comprising a mast rod having a free end for supporting a safety pennant and a base end, said mounting assembly including a mounting bolt and a grip collar for securing the mast detachably to the mounting bolt, said mounting bolt having a free upright end provided with a drilled bore socket opening extending partially its length to receive and anchor the base end of the mast rod, said grip collar made of a substantially hard and resilient plastic material, said collar having a pair of connecting bore openings, one of said collar openings receiving said base end of the mast rod in a snug fit, and the other of said collar openings receiving said free end of the bolt in a snug fit, said grip collar enabling the base end of the mast rod to flex into the resilient collar along a gentle radius avoiding a sharp bend, whereby the mast can be disconnected from both the bolt and the grip collar manually by a longitudinal pulling force without the need for tools.

* * * * *